S. BACK, Jr.
RAIN SHIELD.
APPLICATION FILED AUG. 17, 1915.

1,201,916.

Patented Oct. 17, 1916.
2 SHEETS—SHEET 1.

Witnesses:
C. Peinle, Jr.
Edwin D. Howes

Inventor,
Seid Back, Jr.
By Victor J. Evans,
Attorney.

S. BACK, Jr.
RAIN SHIELD.
APPLICATION FILED AUG. 17, 1915.

1,201,916.

Patented Oct. 17, 1916.
2 SHEETS—SHEET 2.

Witnesses:
C. Peinle, Jr.
Edwin D. Jones

Inventor,
Seid Back, Jr.

By Victor J. Evans,
Attorney.

UNITED STATES PATENT OFFICE.

SEID BACK, JR., OF PORTLAND, OREGON.

RAIN-SHIELD.

1,201,916.  Specification of Letters Patent.  Patented Oct. 17, 1916.

Application filed August 17, 1915. Serial No. 45,945.

*To all whom it may concern:*

Be it known that I, SEID BACK, Jr., a citizen of the United States, residing at Portland, in the county of Multnomah and State of Oregon, have invented new and useful Improvements in Rain-Shields, of which the following is a specification.

My invention relates to wind shields for vehicles, and has particular application to the "rain-vision" type of wind shield.

The primary object of my invention is to provide a device of this character having means for automatically removing any foreign matter, such as particles of water, snow or condensed moisture of any description from the surface of the wind shield whereby clear vision may be maintained at all times.

Another object of my invention is to provide a wind shield comprising a movable flexible transparent element and means associated therewith for removing foreign matter from the surface thereof.

Another object of my invention is to provide a wind shield which will be automatically cleaned when motion is imparted to the vehicle, as, for instance, street cars, automobiles, locomotives or the like.

With these and other objects in view, the invention consists in the features of construction, combination and arrangement of parts hereinafter described and claimed, reference being had to the accompanying drawing, in which—

Figure 1:
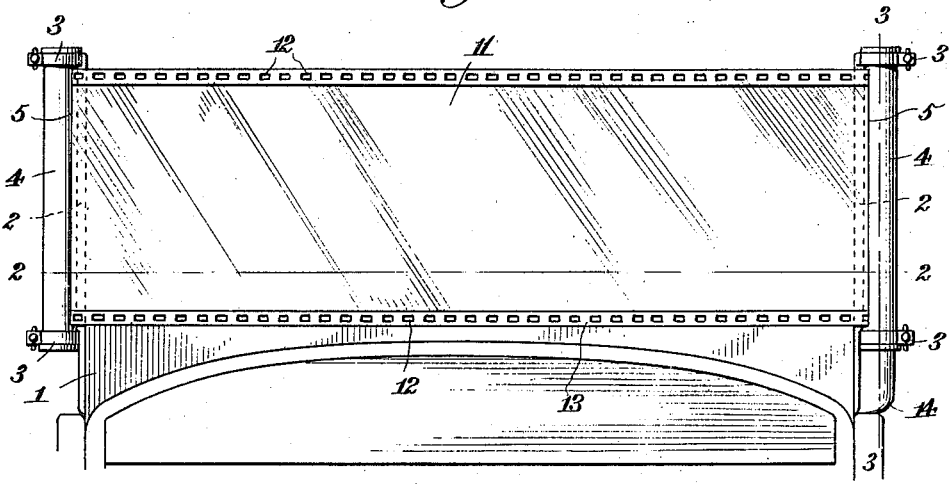
Figure 2:
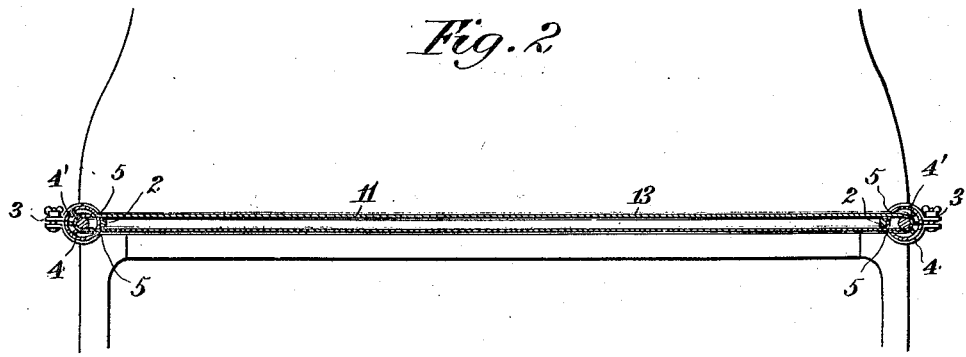
Figure 5:
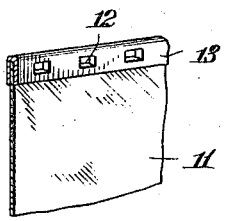
Figure 3:
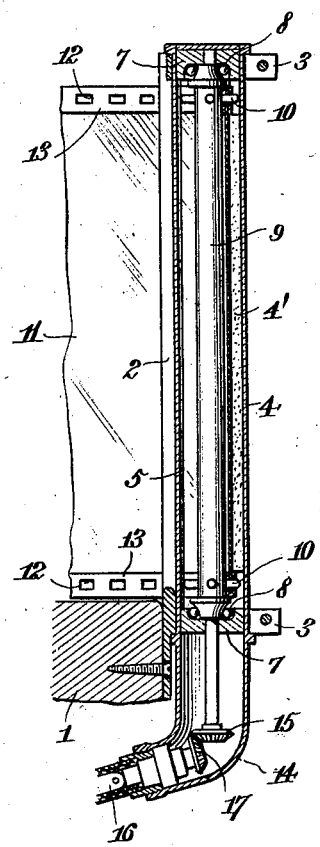
Figure 4:
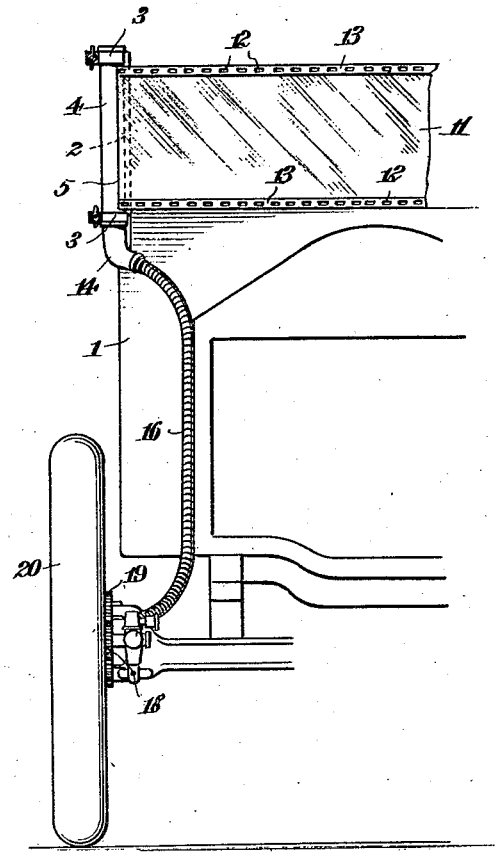

Figure 1 is a fragmentary section of a vehicle showing the wind shield and dash in elevation; Fig. 2 is a transverse section on the line 2—2; Fig. 3 is a vertical section on the line 3—3; Fig. 4 is a fragmentary section of a vehicle, showing the connection between the wind shield and the wheel of the vehicle; and Fig. 5 is a detail view of the endless transparent sheet.

Referring to the drawings in detail, 1 designates the dash of the vehicle, which is of the usual construction. Secured to the opposite ends of the dash 1 and upstanding therefrom are rods 2 having spaced clamping rings 3 rigidly secured thereto, and mounted within the clamping rings and vertically arranged upon the rod are elongated cylinders 4 which have the inner faces thereof provided with longitudinally extending spaced slots 5. Arranged within the cylinders are spaced brackets 7 which support ball bearings 8. Journaled within the bearings 8 are vertically arranged shafts 9, each of which has gear wheels 10 rigidly secured thereto adjacent the opposite ends thereof. Secured to the inner walls of the cylinders 4 are a series of longitudinally extending strips 4' which constitute wipers and are adapted to contact with the surface of the hereinafter described sheet.

11 designates a transparent endless sheet of material, such as celluloid or the like, and is provided at its marginal edges with a series of openings 12.

In order to present a more substantial structure I provide the walls of the openings 12 and the marginal edges of the sheet 11 with a strip of leather 13, whereby any accidental breaking or tearing of the sheet will be prevented. As is shown in Fig. 1, the transparent sheet extends across the dash of the vehicle and passes through the slots in the cylindrical members and is trained around the shafts 9, the teeth of the gear wheels 10 engaging the walls of the openings 12. I preferably form the cylinders 4 with closed ends with the exception of the lower end of one of the cylinders, which is open and receives a substantially L-shaped cylindrical casing 14. Mounted upon the lower end of one of the shafts 9 within the cylinder just referred to is a beveled gear 15. Journaled within the casing 14 is one extremity of a flexible shaft 16 of common construction, which has its terminal portion provided with a beveled gear 17 which meshes with the gear 15. The flexible shaft 16 as shown in Fig. 4 has its intermediate portion suitably connected to the body of the vehicle and has its lower extremity provided with a sprocket wheel 18 which meshes with another sprocket wheel 19 which is rigidly secured to the hub of the wheel 20.

From the foregoing description, taken in connection with the accompanying drawings, the construction and operation of my wind shield will be readily apparent. Upon movement of the vehicle, motion is transmitted from the wheel of the vehicle through the medium of the flexible shaft 16 to one of the shafts 9 carrying the beveled gear 15, whereby said shaft will be rotated. The gear wheels 10 being rigidly secured to the shaft 9 engaging the openings in the sheet 11 will impart a continuous horizontal movement to the sheet 11 across the dash of the vehicle. The opposite extremity of the sheet 11 being trained through the outer cylinder 4 and around the shaft 9, a rotary motion will be imparted thereto. The wipers or strips of rubber which are arranged within the cylinders 4, contacting with the surface of the sheet 11, will remove moisture of any description from the surface of the sheet 11, thereby keeping the surface clean at all times and presenting a clear vision for the occupant of the machine. It is of course understood that the foreign matter which collects upon the surface of the sheet will be precipitated into the cylinder. I have not shown any means for directing the water or snow out of the cylinders, but I wish it to be understood that I consider it within the scope of this invention to provide any suitable means for directing the foreign matter exteriorly of the cylinders.

In the event that it is desired to have the transparent endless sheet remain idle suitable means may be provided upon the flexible shaft for disengaging the sprocket 18 from the wheel carried sprocket.

It is thought from the foregoing, taken in connection with the accompanying drawings, that the construction and operation of my device will be clearly understood without further description, minor changes in size, shape, proportion and minor details of construction being permissible without departing from the spirit and scope of the hereunto appended claims.

Having thus described my invention, I claim:

1. A wind shield for vehicles comprising spaced shafts upstanding from the dash of said vehicle, gears rigidly mounted on said shafts, an endless sheet of transparent material connecting said shafts and trained over said gears, wipers engaging said sheet, and axle-driven means connected to one of said shafts for continuously moving the sheet across the vehicle.

2. A wind shield for vehicles comprising spaced cylinders upstanding from the dash of said vehicle, shafts arranged in each of said cylinders, each of said cylinders having spaced slots formed therein, gears mounted on said shafts, an endless sheet of transparent material having a series of openings formed in the marginal edges thereof, said sheet connecting said shafts and extending through the slots in said cylinders and trained over said gears, the teeth of said gears engaging the walls of the openings in said sheet, wipers arranged within each of said cylinders and engaging said sheet, a beveled gear mounted upon the lower end of one of said shafts, a sprocket wheel secured to the axle of said vehicle, and a flexible shaft connecting said sprocket wheel with the beveled gear.

3. A wind shield comprising spaced shafts, an endless sheet of transparent material connecting said shafts and trained over said shafts, wipers engaging said sheet, and means for rotating one of said shafts.

4. A wind shield comprising a pair of spaced shafts, housings surrounding each of said shafts, an endless sheet of transparent material trained over said shafts and connecting the same, wipers mounted in each of said housings and engaging said sheet, and means for rotating one of said shafts.

In testimony whereof I affix my signature in presence of two witnesses.

SEID BACK, Jr.

Witnesses:
  GEO. W. MOSHERS,
  J. A. BECKWITH.